J. G. FRIBERG.
ANTISKIDDING ATTACHMENT FOR VEHICLE WHEELS.
APPLICATION FILED AUG. 24, 1916.
1,237,771.
Patented Aug. 21, 1917.
2 SHEETS—SHEET 1.
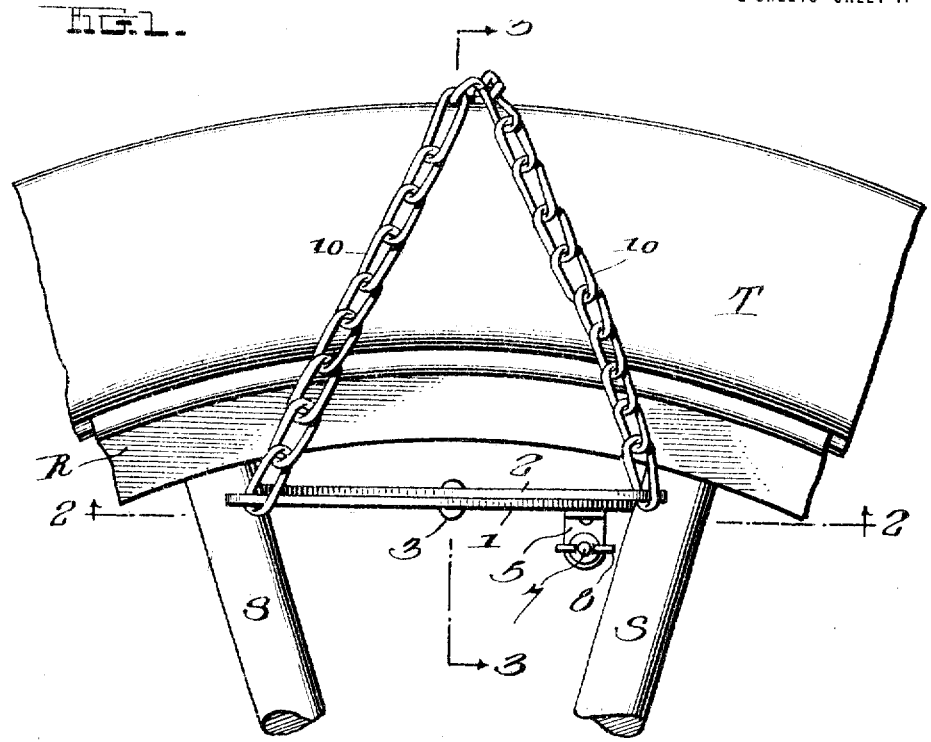
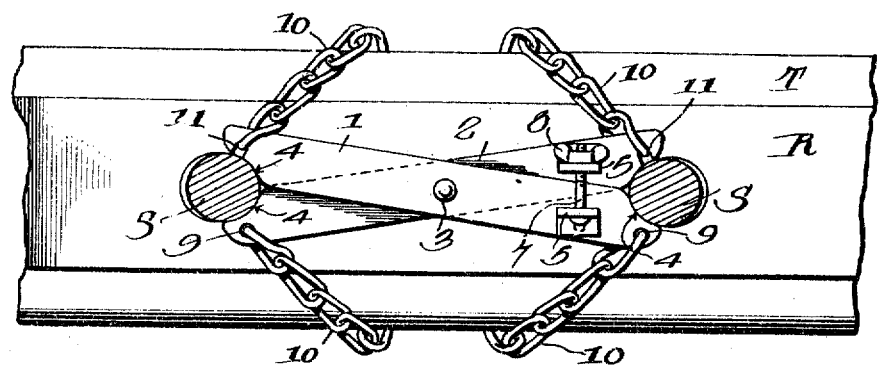

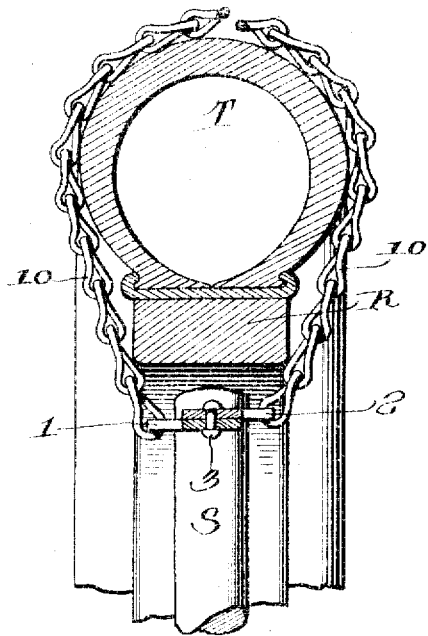
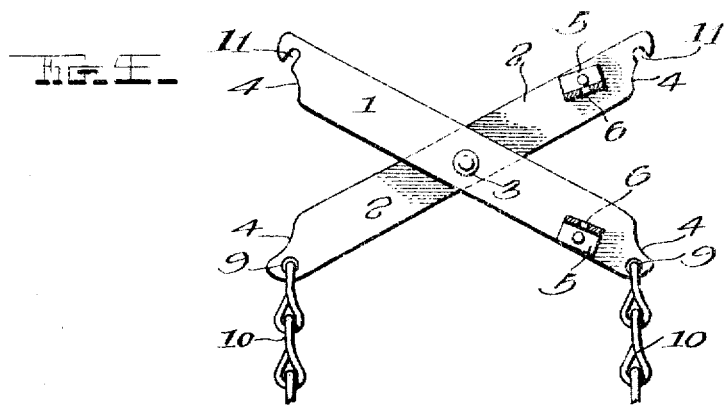

UNITED STATES PATENT OFFICE.

JOHN G. FRIBERG, OF MAIDEN ROCK, WISCONSIN.

ANTISKIDDING ATTACHMENT FOR VEHICLE-WHEELS.

1,237,771. Specification of Letters Patent. Patented Aug. 21, 1917.

Application filed August 24, 1916. Serial No. 116,678.

*To all whom it may concern:*

Be it known that I, JOHN G. FRIBERG, a citizen of the United States, residing at Maiden Rock, in the county of Pierce and State of Wisconsin, have invented certain new and useful Improvements in Antiskidding Attachments for Vehicle-Wheels; and I do declare the following to be a full, clear, and exact description of the invention, such as will enable others skilled in the art to which it appertains to make and use the same.

This invention relates to an anti-skidding structure for vehicle wheels.

The primary object of the invention is to provide an anti-skidding device for vehicle wheels which may be easily and readily attached to the wheel and removed therefrom.

Another object of the invention is to generally improve upon devices of this character by the provision of a device which will be simple, strong, durable and comparatively inexpensive in construction, efficient and reliable in operation, and well adapted to the purpose for which it is designed.

With these and numerous other objects in view the invention consists of certain novel features of construction and the combination and arrangement of parts as will be hereinafter fully described and claimed.

In the accompanying drawings, in which similar reference characters designate like parts throughout the several views, Figure 1 is a side elevation of a portion of a vehicle wheel, showing a device constructed in accordance with this invention;

Fig. 2 is a horizontal sectional view taken on the plane of the line 2—2 of Fig. 1;

Fig. 3 is a transverse sectional view taken on the plane of the line 3—3 of Fig. 1; and Fig. 4 is a plan view of the device detached from the vehicle wheel, the anti-skid chains being broken away.

Referring more particularly to the drawings, a clamp is shown composed of a pair of crossed members 1 and 2 which are pivotally connected at a point substantially midway of their ends by means of a rivet 3. As clearly shown by Figs. 1 and 2 of the drawings, the inner sides of the ends of the members 1 and 2 are cut away as at 4, the cut away portions at the adjacent ends forming in conjunction with each other suitable sockets for receiving the spokes of a vehicle wheel in connection with which the device is adapted to be used.

Secured to one of the sides of the members 1 and 2 near one of the ends of the same are brackets 5 having apertures 6 therein, and extending through said apertures is a clamping bolt 7, the threaded free end of which receives a thumb nut 8 for locking or holding said members in their clamped position with respect to the spokes of the wheel to be more fully described hereinafter. It is to be here noted that any other equivalent means for holding these members in their clamped position may be substituted for the brackets, clamping bolt, and nut shown in the drawings.

One of the ends of the members 1 and 2 are provided with apertures 9 through which extend one of the ends of a pair of anti-skid elements, here shown in the form of chains 10. The other ends of the members 1 and 2 are provided with notches 11 on the notched out portions 4 of their inner sides for receiving the other ends of the chains 10 in a manner to be hereinafter described.

The device is designed to be used in connection with a vehicle wheel having a plurality of spokes S, a rim or felly R and a tire T. When applying it to the wheel, the clamp is disposed longitudinally between two adjacent spokes S on the inner side of the rim R and between the planes passing through the edges of the latter. It is obvious that when the device is thus applied the clamping nut 8 is removed from the bolt 7 and the latter is removed from the aperture 6 in the bracket 5 carried by the member 2, and the members are swu  on their pivot so as to bring their ends farther apart. This will cause the clamp to be shortened, thereby allowing the same to be easily inserted between the spokes. The anti-skid chains 10 are then carried substantially spirally around the tire T crossing each other at the tread of the same, and having one of the links at their free ends disposed in the notches 11 at one of the ends of the members 1 and 2. The members 1 and 2 are then drawn together, the nut 8 threaded upon the bolt 7 and tightened so as to firmly clamp the spokes S between the notched out portions 4 of said members. Owing to the fact that the open sides of the notches 11 are disposed adjacent the spokes S, they are closed by the latter when the members 1 and 2 are thus locked in their clamped positions with respect to the same. It is obvious that the device may be adjusted to fit tires of different diameters by engaging the proper links of the chains 10 with the notches 11.

By having the anti-skid chains 10 carried spirally around the tire and crossed at a point substantially coincident with the tread of the same, a more efficient anti-skidding or gripping action upon the road or other surface over which the vehicle is passing, will be effected. However, it is to be understood that I do not wish to limit myself to carrying the chains around the tire in this manner, as obviously they need not be crossed.

From the foregoing description, taken in connection with the accompanying drawings, the construction and operation of the device will be readily understood without a more extended explanation.

As numerous other changes in form, proportion, and in the minor details of construction may be resorted to without departing from the spirit of this invention, I do not wish to be limited to the construction herein shown and described other than that set forth in the appended claims.

I claim:—

1. The combination with a vehicle wheel, a member extending longitudinally between two adjacent spokes of said wheel and being disposed entirely between the planes passing through the edges of the rim thereof, said member being provided with movable clamp members engaging the opposite sides of said adjacent spokes, means for locking said clamp members in their spoke engaging positions, and an anti-skid element connected to said member and extending around the tire of said wheel.

2. The combination with a vehicle wheel, of a clamp composed of a pair of crossed and pivotally connected members disposed on the inner side of the rim of said wheel and engaging the opposite sides of adjacent spokes of the same, means carried by said members for removably locking the same in their clamped positions with respect to said spokes, and a flexible anti-skid element connected to said clamp and extending around the tire of said wheel.

3. The combination with a vehicle wheel, of a pair of crossed and pivotally connected members disposed on the inner side of the rim of said wheel and engaging the opposite sides of two adjacent spokes of the same, brackets fixed to one of the ends of said members and having apertures therein, a clamping bolt extending through said apertures and having a nut on the threaded end thereof for removably locking said members in their clamped positions with respect to said spokes, and flexible elements connected to the ends of said members and extending around the tread of the wheel.

4. The combination with a vehicle wheel, of a pair of clamp members disposed on the inner side of the rim of said wheel and engaging the opposite sides of two adjacent spokes of the same, means for removably locking said members in their clamped positions with respect to said spokes, said members being provided with notches in the inner edges of one of their ends, the open ends of said notches being closed by said spokes when said members are in their clamped positions with respect to the same, and flexible anti-skid elements having one of their ends disposed in said notches, and their other ends connected to the other ends of said clamp members.

5. A device of the class described comprising a pair of crossed and pivotally connected clamp members, means carried by said members for removably locking the same in their clamped positions, and flexible anti-skid elements connected at their ends to the ends of said members.

6. A device of the class described comprising a pair of crossed and pivotally connected clamp members, anti-skid elements connected at their ends to the ends of said members, brackets fixed to one of the sides of said members at adjacent ends thereof and having apertures therein, a clamping bolt extending through the apertures in said brackets, and a clamping nut disposed on the free end of said bolt for locking said members in their clamped positions.

In testimony whereof I have hereunto set my hand in the presence of two subscribing witnesses.

JOHN G. FRIBERG.

Witnesses:
 R. H. CARPENTER,
 F. W. CARPENTER.